(12) United States Patent
Husby et al.

(10) Patent No.: US 6,871,874 B2
(45) Date of Patent: Mar. 29, 2005

(54) AIRBAG DEPLOYMENT VELOCITY SENSOR

(75) Inventors: Harald S. Husby, Lakeland, FL (US); John Fisher, Lutz, FL (US); Brian Ford, Mt. Clemens, MI (US); Joel Jerrim, Grand Blanc, MI (US); Rolf Sawall, Frankfurt (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 217 days.

(21) Appl. No.: 10/321,524

(22) Filed: Dec. 18, 2002

(65) Prior Publication Data

US 2004/0119273 A1 Jun. 24, 2004

(51) Int. Cl.7 .............................................. B60R 21/16
(52) U.S. Cl. ................................... 280/743.2; 280/735
(58) Field of Search .............................. 280/743.2, 735, 280/743.1, 739, 741, 736, 742

(56) References Cited

U.S. PATENT DOCUMENTS 5,762,367 A    6/1998  Wolanin
6,129,379 A   10/2000  Specht ........................ 280/735
6,241,282 B1   6/2001  Specht
6,250,677 B1   6/2001  Fujimura ................. 280/743.2
6,308,983 B1  10/2001  Sinnhuber
6,371,517 B1   4/2002  Webber et al. ............. 280/736

FOREIGN PATENT DOCUMENTS

DE    196 11 384 A    9/1997
EP       0812741      3/1997
EP       0990567      9/1999

*Primary Examiner*—Eric Culbreth
(74) *Attorney, Agent, or Firm*—Lonnie Drayer; Patrick Steinnon (57) ABSTRACT

An airbag module utilizes tape dispensing cartridges. A tape end extends from each cartridge to the inside surface of an airbag. As the airbag inflates, tape is drawn from the tape cartridges as the tapes are drawn along with the deploying airbag. The rate at which tape is withdrawn from the cartridges is measured by sensible indicia of a magnetic or optical nature positioned on the tape and drawn past a sensor contained within the tape cartridge. The markings on the tape can be nonuniform along the length of the tape. The tape storage area outlet and the cartridge outlet are each formed by two relatively large radius corners. The tape is sealed to the cartridge to prevent the ingress of contaminants. As the airbag withdraws tape from the cartridges, the seals are unseated.

21 Claims, 5 Drawing Sheets

AIRBAG DEPLOYMENT VELOCITY SENSOR

BACKGROUND OF THE INVENTION

The present invention relates to airbags and sensors used to control air bag deployment in general, and to sensors that monitor the actual deployment sequence in particular.

While airbags were originally developed as a passive restraint system, experience has shown that airbags work best in combination with seatbelts and other safety systems. Although airbags contribute to the overall safety of the occupants of a motor vehicle, they can present a danger to an occupant who is positioned too close to an airbag when it deploys. This condition, where the vehicle occupant is positioned so that airbag deployment might be dangerous, is referred to as the occupant being "out of position". Various systems have been developed to detect an "out of position" vehicle occupant. Sensor systems designed to detect the vehicle occupant's position often require constant monitoring so that in the event of a crash the occupant's position is known. Sensor systems designed to detect the position of the vehicle occupant have been proposed based on ultrasound, optical, or capacitance sensors. Constant monitoring of sensors, which may have high data rates, requires the design of algorithms that can reduce sensor data to a single condition or a limited number of data conditions that are used in an airbag deployment decision to prevent airbag deployment or for a dual stage airbag to select the level of deployment. Maintaining data integrity between the non-crash positional data, and positional data needed during airbag deployment is complicated by the noisy environment produced by a crash. Dealing with data integrity issues requires increased processor capabilities and algorithm development, which also requires additional testing.

Prior art approaches attempt to determine, based on various sensors, the distance between the airbag and the vehicle occupant before the airbag is deployed. In many instances, the vehicle occupant will not be too close to the airbag at the time the decision to deploy the airbag is made, but, because of the rate at which the vehicle occupant is approaching the airbag, the vehicle occupant will be too close when the airbag is actually deploying. To handle these situations, more sophisticated sensors and algorithms are needed to attempt to predict the occupant's position when the airbag is actually deployed or nearly completely deployed. In other words, the ideal airbag deployment system functions such that the airbag deploys fully or nearly fully before the vehicle occupant engages the airbag. Existing systems inhibit airbag deployment when, based on various sensors and algorithms, it is determined that, because of the position of the vehicle occupant, the airbag is more likely to harm than to benefit the occupant. Successfully creating a sensor and algorithm system is complicated inasmuch as there is usually very little delay between the decision to deploy and the actual deployment. This is so because the maximum benefit from an airbag is achieved by early deployment, and at the same time, more time before deployment maximizes the information available to determine whether deployment is necessary. The desire to maximize effective deployment of the airbag while minimizing unnecessary deployment creates a tension between waiting for more information and deploying immediately. Therefore, once sufficient information is available, deployment typically follows nearly immediately.

Therefore, a system that employs vehicle occupant position sensors and algorithms must be able to supply at all times an indication of whether airbag deployment should be inhibited so that the inhibit decision can be applied whenever the airbag deployment decision occurs. This means the sensors and algorithms used to develop the occupant position inhibit signal cannot be optimized to deal with a specific time frame in which the actual deployment decision is made. The end result is that such algorithms may be less accurate than desired because they must predict events relatively far in the future, perhaps tens of milliseconds. One known type of sensor shown in European application EP 0990567A1 employs a plurality of tapes that extend between the front of the airbag and a tape dispensing cartridge mounted on the airbag housing. Tape extraction sensors within the cartridge monitor the rate at which tape is withdrawn from the cartridge and can detect airbag impact with a vehicle occupant by a decrease in airbag velocity as measured by the rate of tape withdrawal from the cartridge. Improvements are needed to the known tape cartridges to improve the functionality and reliability of the tape type airbag deployment monitoring sensors.

SUMMARY OF THE INVENTION

The airbag module of this invention utilizes several tape dispensing cartridges mounted on an airbag housing. A quantity of tape is stored within each cartridge. A tape end extends from each cartridge, and is mounted to the inside surface of an airbag that is attached to the airbag housing. A gas generant cartridge positioned within the airbag housing is used to inflate the airbag. As the airbag inflates, tape is drawn from the tape cartridges as the free ends of the tapes are drawn along with the airbag as it deploys. The rate at which tapes are withdrawn from the cartridges is measured by sensible indicia of a magnetic or optical nature positioned on the tape and drawn past a sensor contained within the tape cartridge. The markings on the tape can be nonuniform along the length of the tape; e.g., the first portion of the tape has no markings so that a photo diode and light sensor will function during a self-test.

The tape cartridge has a storage area for tape where the tape is stored folded or wound. The outlet of the storage area has an opening surrounded by relatively large radius corners approximately one-quarter inch or six millimeters in radius to facilitate the smooth withdrawal of tape from the storage area. In a similar manner, the outlet of the cartridge is formed by two relatively large radius corners of approximately one quarter inch, or six millimeters, in radius to prevent the tape from breaking, because especially as the airbag is first deployed, the airbag and the attached tape may pull from a wide range of directions. Between the stored tape and the tape outlet a brake is positioned. The brake comprises a spring-loaded plunger that pushes a smooth brake surface against the tape as it traverses a brake surface parallel to the path of the tape. The brake allows tape to be withdrawn from the cartridge as long as a relatively strong force is applied to the tape by the expanding airbag. When the airbag collides with an object so that the portion of the airbag stops moving forward the tape attached to that portion of the airbag is no longer pulled from the cartridge, and the brake is sufficient to overcome the inertia of the already deployed tape within a few millimeters or centimeters of tape travel.

The tape may be constructed of cloth that is woven or marked with a pattern of transverse lines extending perpendicular to the direction in which the tape is extracted. A light source such as a light emitting diode is mounted to the cartridge on one side of the tape and a light sensitive sensor is mounted to the cartridge on the side of the tape opposite the light source. Movement of the tape causes the light sensor output to change depending on whether or not a line is positioned between the light source and a light sensor. By counting or otherwise tracking the number of times or the rate at which the light is alternatively blocked or transmitted, the rate at which tape is being withdrawn from the cartridge can be determined. When a portion of the airbag collides with an object or vehicle occupant, that portion at the airbag ceases its forward movement and that causes the tape to no longer be extracted from the cartridge, or to be extracted at a substantially lower rate. The transverse markings may be nonuniformly spaced along the tape. For instance, the markings may not exist at all at the very beginning of the tape so that nondestructive testing can be performed by turning on the light source and detecting it with the light sensor. Alternatively a special marking with different transmissivity or reflectivity at the beginning of the tape could be used to produce a recognizable signal that would verify the functionality of the sensor, and that the tape has not been inadvertently pulled out e.g. during the airbag module assembly.

Airbags and their components must function years after they are manufactured. For this reason, to prevent the tape cartridge and the components within the tape cartridge from deteriorating, the tape cartridge is sealed. More particularly, an elastomeric grommet is mounted on the tape and positioned at the outlet of the cartridge. The grommet snaps to the cartridge to prevent the ingress of moisture and dust or other contaminants. The relatively strong pull of the deploying airbag unseats the grommet, allowing the tape to be withdrawn from the cartridge. Alternatively, a wax or elastomeric seal may be formed between the tape and the inside surfaces of the tape cartridge outlet.

It is a feature of the present invention to provide a means for detecting an out of position vehicle occupant when an airbag deployment is occurring.

It is another feature of the present invention to provide a tape cartridge that provides a tape withdrawal signal which facilitates processing of the withdrawal signal.

It is further feature of the present invention to provide a tape cartridge wherein the tape can be withdrawn reliably over a range of angles.

It is yet another feature of the present invention to provide a tape cartridge that can be sealed against the environment to increase service life.

It is a still further feature of the present invention to provide a tape cartridge that can provide a built-in test function.

It is still another feature of the present invention to provide a more reliable tape cartridge with simplified construction.

Further features and advantages of the invention will be apparent from the following detailed description when taken in conjunction with the accompanying drawings.

DETAILED DESCRIPTION OF THE INVENTION

Figure 1:
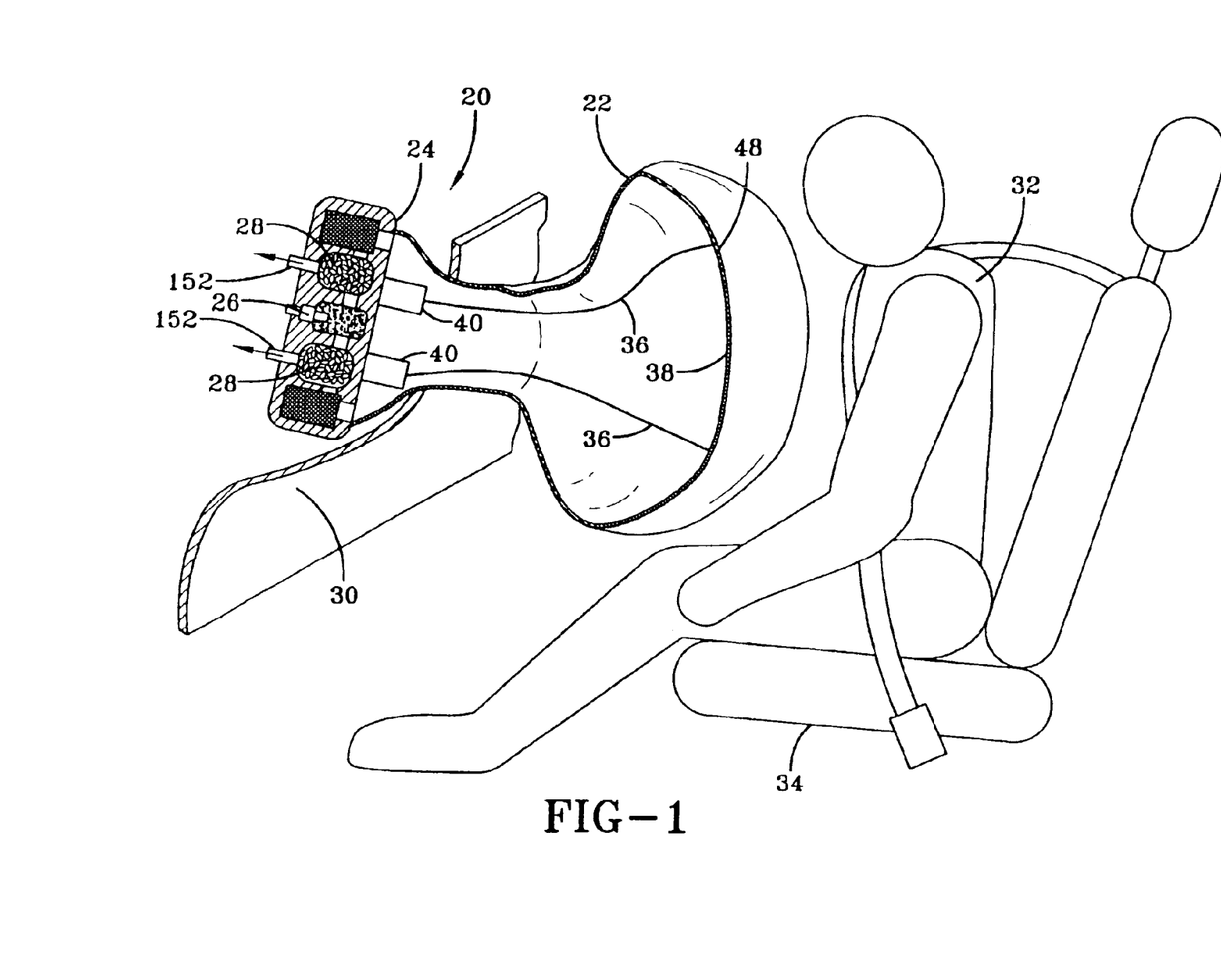
FIG. 1 is an isometric view, partially cut away in section, of the airbag module of this invention as the airbag is deployed.

Referring more particularly to FIGS. 1–10, wherein like numbers refer to similar parts, an airbag module 20 deploying an airbag 22 is shown in FIG. 1. An airbag housing 24 contains an igniter 26 and a quantity of gas generant 28 such as 5-aminotetrazole and is mounted behind an instrument panel 30. A vehicle occupant 32 is seated on a vehicle seat 34 facing the airbag 22. Cloth tapes 36 are fastened to the inside surface 38 of the airbag 22, and are retained within tape dispensing cartridges 40 mounted to or behind the airbag housing 24. The cartridges 40 are mounted fixed with respect to the airbag housing so the relative movement of the airbag 22 can be measured. When the airbag module 20 is activated, the airbag 22 deploys towards the vehicle occupant 32, and the tapes 36 are withdrawn from the cartridges 40. The purpose of the cartridges 40 and the tapes 36 that are withdrawn from the cartridges is to allow the detection of an "out of position" vehicle occupant and adjust or stop the deployment of the airbag in response to detecting the "out of position" vehicle occupant.

Figure 2:
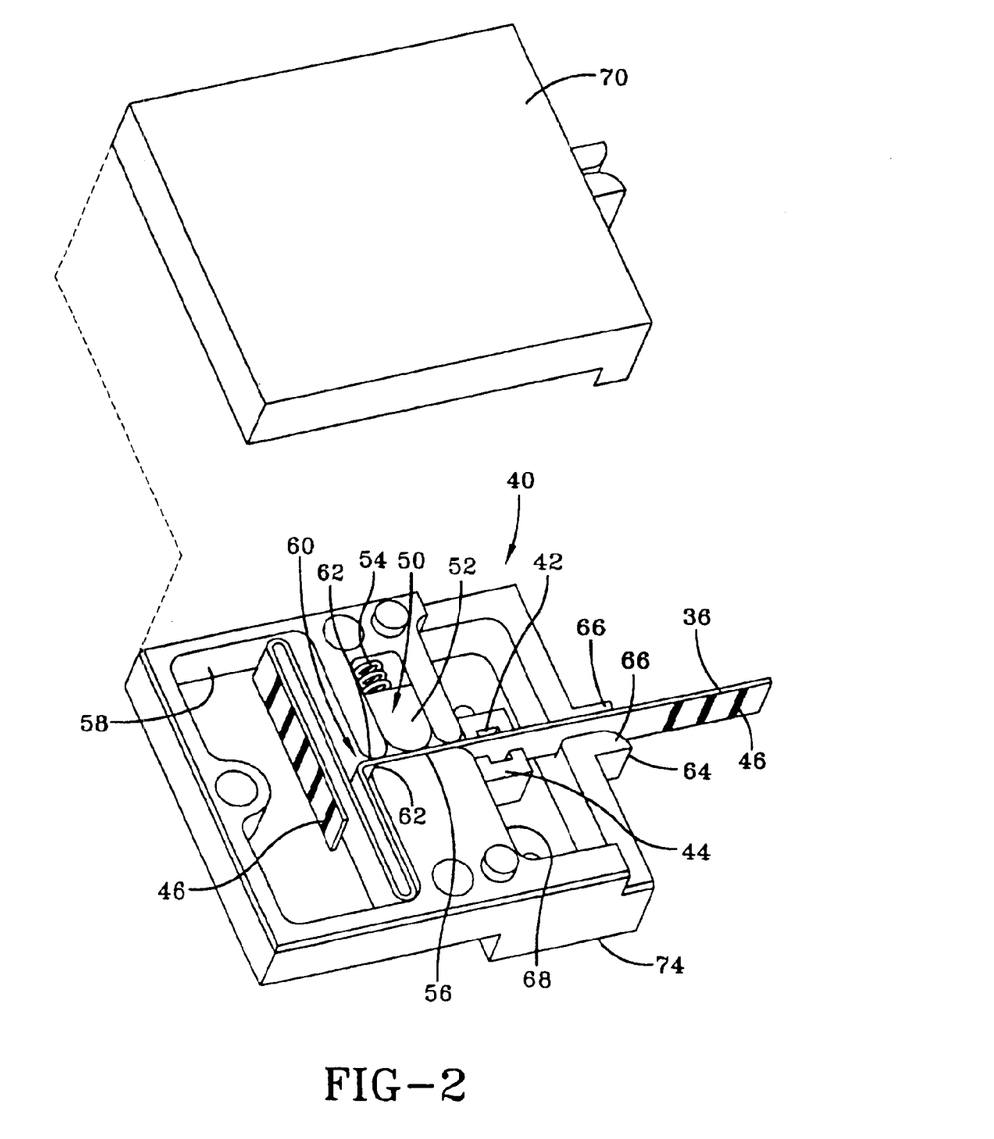
FIG. 2 is a partially exploded isometric view of the tape cartridge of this invention.

As shown in FIG. 2, withdrawal of a tape 36 from a dispenser cartridge 40 is monitored by a light emitting diode 42 mounted within the cartridge 40. The light emitting diode 42 passes light through the tape 36 to a light sensor 44 mounted opposite the diode 42. The sensor detects the changing light intensity as the tape 36 passes between the light emitting diode 42 and the light sensor 44. The tape 36 has bands of dark coloring 46 that may be printed on the tape or woven into the tape. As a tape 36 is withdrawn from a cartridge 40, the light sensor 44 alternatively receives or does not receive light from the diode 42. By monitoring the rate (frequency) at which the light sensor 44 transitions from receiving light to not receiving light, the number of bands 46 that have passed between the light emitting diode and the light sensor can be determined. When correlated with time, the distance, velocity, and acceleration of an airbag portion 38 to which a tape 36 is attached can be determined from the signal derived from the tape cartridges 40.

When the portion 38 of the airbag to which the tape 36 is attached comes into contact with an object, the bag portion decreases in velocity or comes to a stop. As shown in FIG. 2, the withdrawal of the tape 36 is continuously being retarded by a brake 50 comprising a plunger 52 biased from a cartridge housing by a spring 54. The plunger 52 constantly urges the tape 36 against an opposed brake surface 56. The brake 50 overcomes the momentum of the tape 36 so that once the bag portion 48 is no longer drawing the tape 36 from the tape dispenser cartridge 40, the tape comes to a stop within a few millimeters to about one centimeter.

Figure 7:
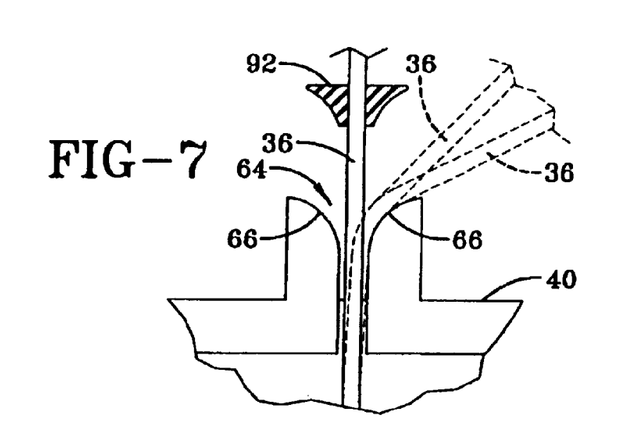
FIG. 7 is an enlarged detail view of tape being withdrawn at a plurality of angles from the outlet of the cartridge of FIG. 2.
Figure 8A:
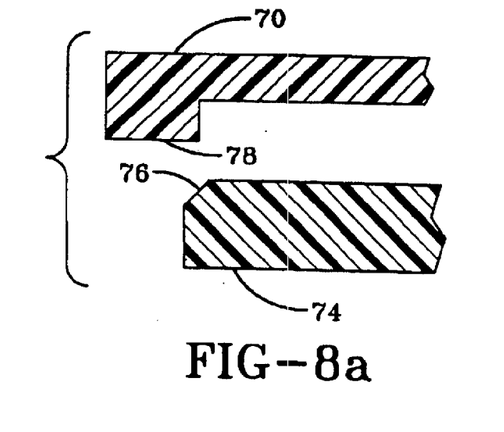
FIG. 8a is an enlarged fragmentary view of the ultrasonic joint used to seal the tape cartridge of FIG. 2 before assembly.
Figure 8B:
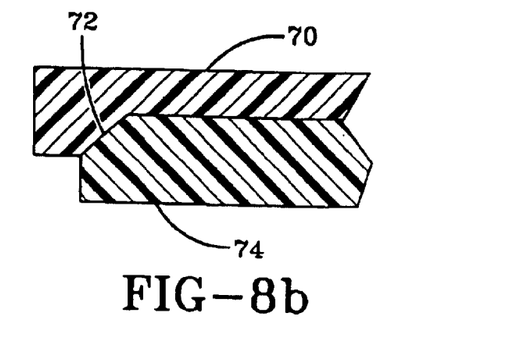
FIG. 8b is an enlarged fragmentary view of the ultrasonic joint used to seal the tape cartridge of FIG. 2 after assembly.

As shown in FIG. 2, the tape 36 is stored folded in a tape compartment 58 that stores about three feet (about one meter) of tape. The outlet 60 of the tape compartment 58 is formed between two radiused corners 62, each having a radius of approximately six millimeters. The radiused outlet 60 allows the tape 36 to be drawn without binding through the tape cartridge 40. The tape 36 travels from the tape compartment 58 past the brake 50 and the sensor 44 and then out of the cartridge at a cartridge outlet 64. The cartridge outlet 64 is also formed by two radiused corners 66 to prevent jamming of the tape 36 as it is drawn at high speed from the cartridge 40. The outlet 60 of the tape compartment 58 and the cartridge outlet 64 form radiused tapers, i.e. a taper where the angle of the taper increases in the direction the tape leaves the cartridge 40. As shown in FIG. 7, during the initial deployment of the airbag 22, the tape 36 may be pulled back and forth at an angle with respect to the cartridge outlet 64. The smooth radiused corners 66 are essential to allow functioning of the high-speed withdrawal of the tape that is simultaneously moving from side to side due to bag flutter.

Figure 4:
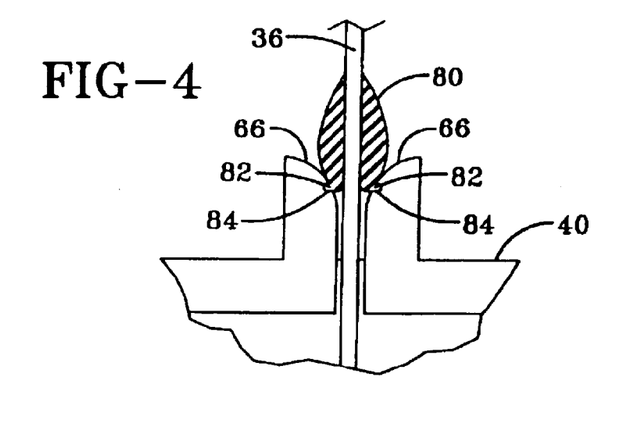
FIG. 4 is an enlarged detail cross-sectional view of the tape outlet of the tape cartridge of FIG. 2 showing a grommet seal.
Figure 5:
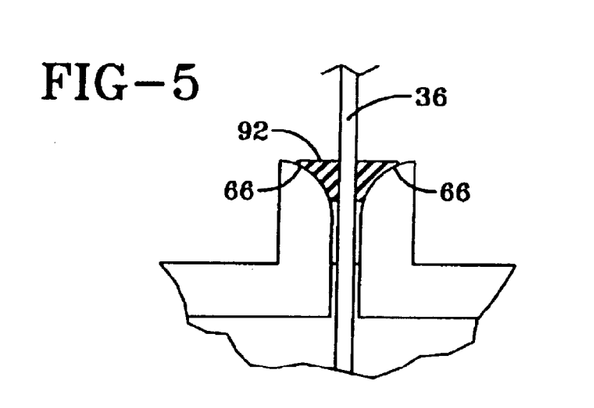
FIG. 5 is an enlarged detail cross-sectional view of the tape outlet of the cartridge of FIG. 2 showing an elastomeric seal.
Figure 6:
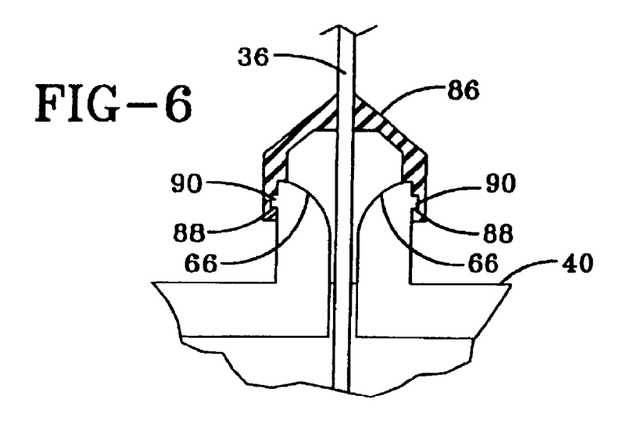
FIG. 6 is an enlarged detail view of the tape outlet of the cartridge of FIG. 2 showing an alternative embodiment grommet seal.

Because of the long life expected from airbag components, it is important that the airbag module 20 be resistant to aging. In particular, the tape cartridge 40 is sealed to prevent moisture and other contaminants from migrating into the interior 68 of the cartridge 40. As shown in FIG. 2, a cover 70 may be ultrasonically welded to a cover bottom portion 74, as shown in detail in FIGS. 8a and 8b. An ultrasonic joint 72 is formed between the cover 70 and the bottom portion 74 of the cartridge. The weld is formed between a beveled edge 76 and an overhanging lip 78. The cover 70 is vibrated at high frequency and brought into engagement with the bottom portion 74, thereby forming a hermetic seal. The tape 38 may be sealed to the cartridge outlet in one of a number of approaches as shown in FIGS. 4–6. A rubber grommet 80, as shown in FIG. 4, may be fixed to the end of the tape that has fingers 82 that fit into grooves 84 in the outlet 64 of the cartridge 40. Alternatively, as shown in FIG. 6, a grommet 86 that is bonded to the tape 36 may be attached by grooves 88 that fit over flanges 90 that protrude from both sides of the outlet. When the tape is extracted from the cartridge, the grommet 86 moves with the tape and pulls away from the outlet 64 that it had previously sealed. Another alternative construction, as shown in FIG. 5, has a sealing material such as a wax or an elastomer such as rubber that forms a seal 92 which likewise pulls away with the tape 36 upon airbag deployment.

Figure 3:
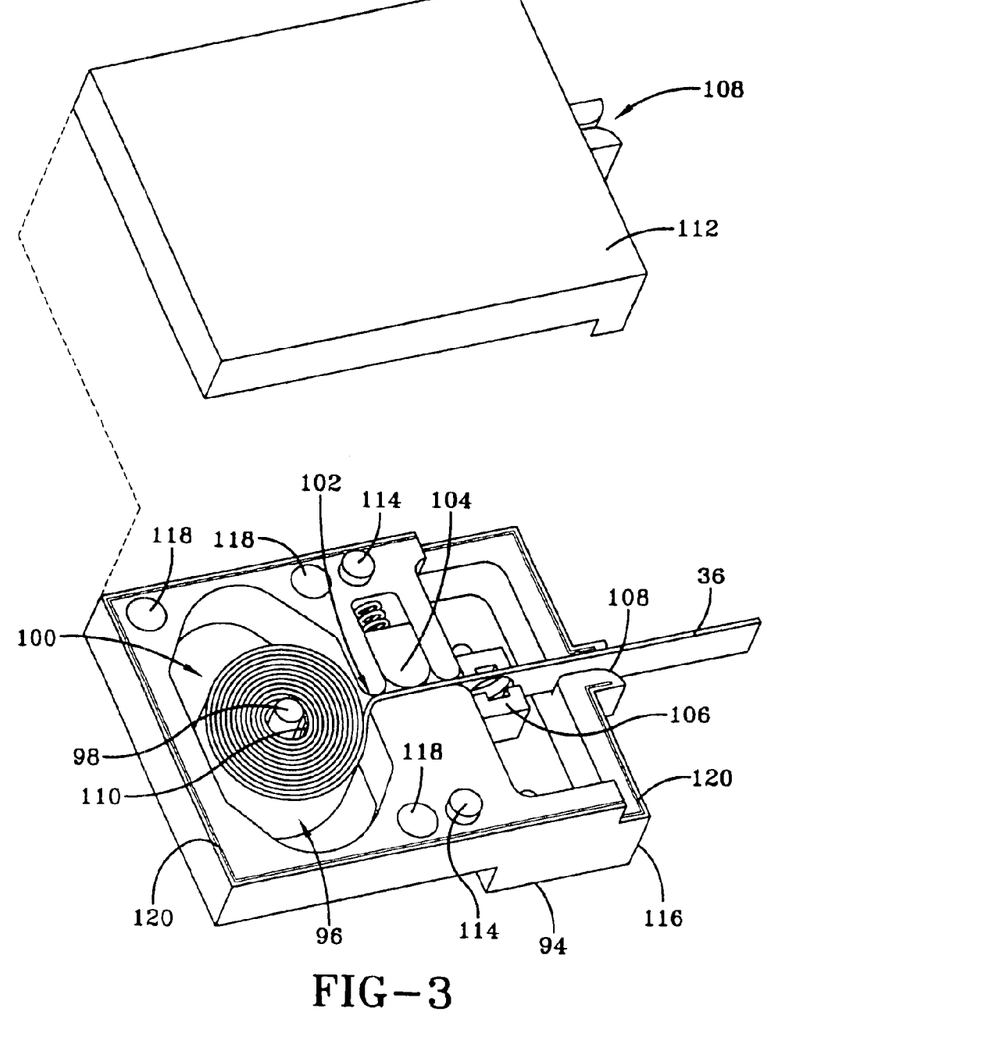
FIG. 3 is a partially exploded isometric view of an alternative embodiment tape cartridge of this invention.

An alternative embodiment tape cartridge 94 is shown in FIG. 3 in which the tape cartridge stores tape 36 wound into a roll 96 that is positioned about but not attached to a spindle 98 positioned in a tape storage compartment 100. The tape cartridge 94 has the advantage that the tape approaches the storage compartment outlet 102 from a more consistent angle. In prior art devices a brake was applied to a spool on which the tape was wound to overcome the momentum of the spinning spool as tape was withdrawn. The tape cartridge 94 employs a brake 104 only on the tape itself, because testing has shown it is not necessary to brake the roll 96. The brake 104 is sufficient to prevent the tape from continuing to leave the cartridge and passing between the sensor 106 and the cartridge outlet 108 when the airbag 22 is no longer pulling on the tape 36. A spool (not shown) could be used with the tape roll 96 and the tape end 110 can be attached to the spool, or to the spindle 98.

The cover 112 of the tape cartridge 94 may be attached by interfitting posts 114 on the bottom portion 116 that fit into holes (not shown) in the cover 112, and posts (not shown) on the cover that fit within holes 118 on the bottom portion 116 of the cartridge 94. A groove 120 surrounds the periphery of the bottom portion 116 and is filled with a gasket, or a dispensed elastomer or adhesive to form the seal with the cover 112.

Figure 9:
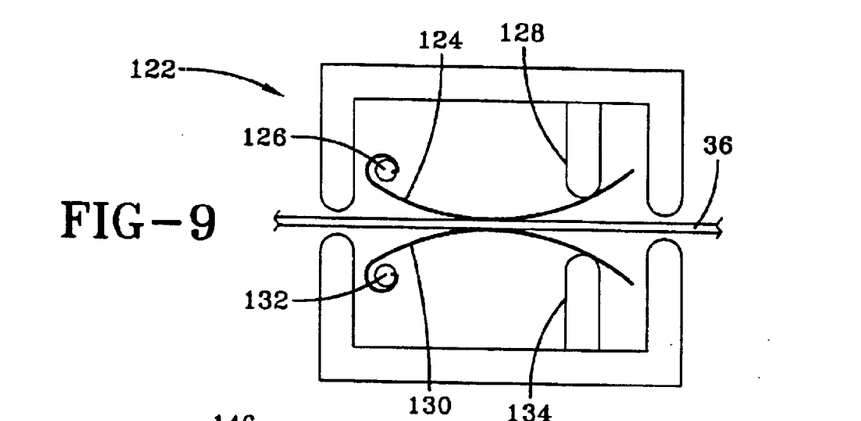
FIG. 9 is a top plan view of an alternative embodiment brake mechanism used with the tape cartridge of FIG. 2.

An alternative design brake 122 within the tape cartridge is shown in the FIG. 9. A first leaf spring 124 is mounted to a first post 126 and positioned by a flange 128. The first leaf spring 124 is biased towards a second leaf spring 130 that is mounted to a second post 132 and positioned by a second flange 134.

Figure 10:
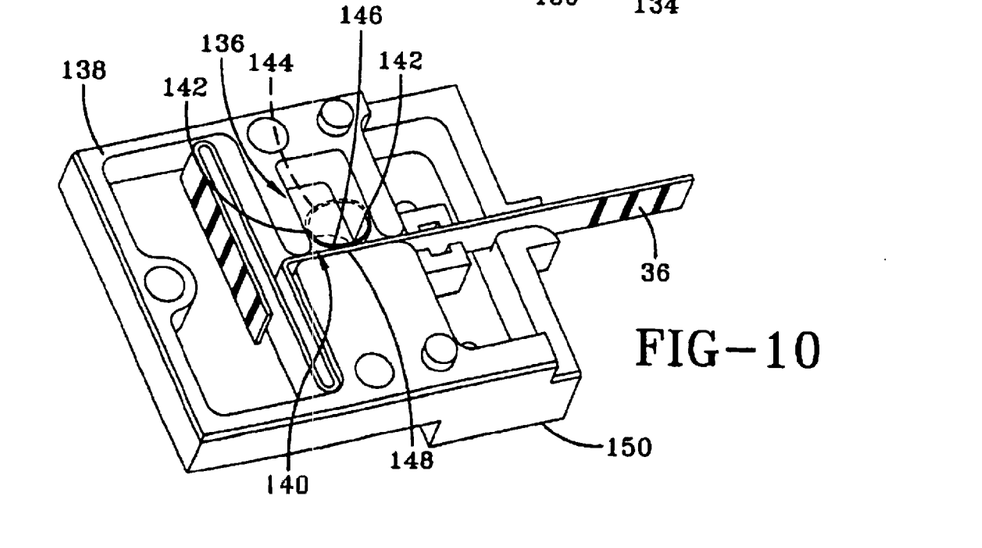
FIG. 10 is an isometric view of an alternative embodiment bottom portion of the tape cartridge of FIG. 2 having an integral molded braking spring.

Yet another design of a brake 136 within the cartridge 138, as shown in FIG. 10, is to co-form a plastic spring member 140 that is mounted by living hinges 142 to the cartridge 138. The spring member 140 is molded in a first position 144 and pushed over center to a second position 146 shown in FIG. 10, where it is biased against a braking surface 148. In order to allow free movement of the plastic spring member 140, the spring may need to be cut free of the cartridge lower portion 150 or could be molded with a hole beneath the spring that is then sealed by a plug (not shown). A side action mold, while increasing the complexity of the mold, could be used to allow the spring to move freely with respect to the cartridge lower portion 150.

Referring to FIGS. 1 and 2, the tape 36 functions as a scan medium that is scanned past a sensor, and can be constructed of woven cloth such as cotton, flax, fiberglass, nylon, and similar materials. The tape 36 can also be of polymer-based film, or a fibrous mat or thin metal. Where light is used in either transmission or reflection to detect the encoding, the tape may be encoded by a variety of techniques. For example, a cloth tape can be dyed, painted or woven with a high contrast pattern. Films may be metallized and subsequently etched to produce a contrast pattern. Physical holes may also be used particularly in a polymer film or metal tape.

The scan medium, or tape 36, can be encoded with a magnetic pattern, by using a magnetizable metal coating on a film, or a magnetizable magnetic strip, or magnetizable fibers within a fibrous tape, or by using a magnetizable ink or the like. The magnetizable material can be selectively positioned or selectively magnetizable to create a detectable pattern when the tape is moved past a magnetic sensor such as a Hall affect sensor or GMR sensor. A conductive film, conductive particles, or threads can also be detected with an inductive sensor.

It should be understood that the scan medium may consist of woven tape, a string or a cord. The width, thickness, length and material from which the scan medium is made, may be varied. Other approaches include a wire, a plastic film, a metal tape, or other elongated member that can be packaged within the cartridge and can be encoded so as to produce a signal when moved past a sensor that is proportional to the length or velocity of the scan medium.

The encoded tape may be designed with uniformly spaced markings that are read optically or magnetically. The spacing may also be nonuniform; for example the first portion of the tape may not have any markings so as to pass or reflect light to a sensor. In this way the presence of the tape and the functioning of light and the light sensor can be tested. In addition, the pattern may be varied, for instance with a logarithmic arrangement, or a change in the spacing of the marks to provide varying resolution during different portions of the airbag deployment. For simplicity in signal processing, the objective may be to generate an alternating signal that can be processed and amplified and filtered in a way which may have benefits in terms of overcoming sources of noise, simplicity of processing, and reliability of algorithms.

Given an expected acceleration profile the markings on the tape could be arranged to produce a single frequency throughout deployment until the cushion forward motion stops. Such an arrangement may simplify the electronics used to detect and monitor airbag deployment.

The information from the sensors that detect the markings on the tape is sent to an electronic control unit that can be used to control vents 152 that may be squib activated, or otherwise activated to let gases out of the airbag module housing 24 to slow or stop inflation. Opening a vent almost instantaneously reduces the pressure in the airbag 22.

It should be understood that where the sensor affecting attributes are described as not being evenly distributed along the elongated scan medium, reference is not being made to the manner in which information is encoded (such as by dark lines, holes, magnetic field reversals etc.) but rather to the fact that the encoding such as the dark lines, holes, magnetic field reversals, is not evenly distributed. In other words, if the tape were withdrawn at a constant rate, the frequency or other aspect of the signal produced by the tape would not remain constant.

It is understood that the invention is not limited to the particular construction and arrangement of parts herein illustrated and described, but embraces all such modified forms thereof as come within the scope of the following claims.

We claim:

1. An airbag device for a motor vehicle comprising:
an airbag housing;
an airbag mounted to the airbag housing, and defining a bag interior surface;
a scan medium cartridge mounted fixed with respect to the airbag housing and containing a quantity of an elongated scan medium stored within the cartridge, the scan medium passing through the cartridge and extending through an elongated scan medium outlet of the cartridge and being attached to the interior surface of the airbag;
a sensor positioned within the scan medium cartridge for detecting scan medium being withdrawn from the cartridge; and
a seal connected to the elongated scan medium to seal the outlet, such that withdrawing of the scan medium from the outlet uncovers the outlet.

2. The airbag device of claim 1 wherein the scan medium outlet of the cartridge has a first surface and a second surface that diverges from the first surface to form a radiused taper.

3. The airbag device of claim 1 wherein the elongated scan medium has sensor affecting attributes, and wherein the sensor is positioned adjacent the scan medium, such that as the scan medium is withdrawn, a signal corresponding to the amount of the tape withdrawn is generated.

4. The airbag device of claim 3 wherein the sensor affecting attributes are not evenly distributed along the elongated scan medium.

5. The airbag device of claim 1 wherein the seal mechanically interfits with a portion of the scan medium cartridge.

6. The airbag device of claim 1 wherein the seal is bonded to the cartridge ground the scan medium outlet.

7. The airbag device of claim 1 wherein the scan medium cartridge comprises a bottom portion and a cover joined to the bottom portion by a hermetic seal.

8. The airbag device of claim 1 further comprising a biasing member positioned within the scan medium cartridge, the biasing member applying a transverse force to the scan medium.

9. The airbag device of claim 8 wherein the biasing member is integrally attached to the cartridge with at least one living hinge.

10. The airbag device of claim 1 further comprising a friction mechanism engaging the scan medium that resists the scan medium being pulled from the scan medium cartridge.

11. The airbag device of claim 1 wherein the seal is fixed to the scan medium to travel with the scan medium between a sealed position in which the seal blocks the outlet, and an uncovered position in which the seal is spaced from the outlet while retained on the scan medium.

12. An airbag device for a motor vehicle comprising;
an airbag housing;
an airbag mounted to the airbag housing, and defining a bag interior surface;
a scan medium cartridge mounted fixed with respect to the airbag housing and containing a quantity of elongated scan medium stored within the cartridge, the scan medium passing through the cartridge and extending through an elongated scan medium outlet, the outlet having a first surface, and a second surface that diverge from each other to form a radiused taper, the scan medium being attached to the bag interior surface;
a seal between the elongated scan medium and the outlet so that the seal is broken by withdrawing elongated scan medium from the storage cartridge;
a sensor positioned within the scan medium cartridge for detecting scan medium being withdrawn from the cartridge;
wherein the elongated scan medium has sensor affecting attributes, and wherein the sensor is positioned adjacent the scan medium so as the scan medium is withdrawn from the cartridge a signal corresponding to the tape withdrawn is generated.

13. The airbag device of claim 12 wherein the seal mechanically interfits with a portion of the scan medium cartridge.

14. The airbag device of claim 12 wherein the sensor affecting attributes are not evenly distributed along the elongated scan medium.

15. The airbag device of claim 12 wherein the scan medium cartridge comprises a bottom portion and a cover joined by a hermetic seal.

16. The airbag device of claim 12 further comprising a biasing member positioned within the scan medium cartridge, the biasing member applying a transverse force to the scan medium.

17. The airbag device of claim 16 wherein the biasing member is integrally attached to the cartridge by at least one living hinge.

18. The airbag device of claim 12 further comprising a friction mechanism engaging the scan medium that resists the scan medium being pulled from the scan medium cartridge.

19. An airbag device for a motor vehicle comprising:
an airbag housing;
an airbag mounted to the airbag housing, and defining a bag interior surface;

a scan medium cartridge comprising a first portion sealed to a second portion, defining a volume there between, the scan medium cartridge mounted fixed with respect to the airbag housing containing a quantity of elongated scan medium stored within the defined volume, the scan medium passing through the cartridge and extending through an elongated scan medium outlet and the scan medium being attached to the bag interior surface;

a sensor positioned within the scan medium cartridge far detecting scan medium being withdrawn from the cartridge; and a friction mechanism engaging the scan medium that resists the scan medium being pulled from the scan medium cartridge, the friction mechanism comprising portions of the first portion of the scan medium cartridge.

20. The airbag device of claim 19 wherein the cartridge outlet has a first surface, and a second surface that diverge from each other to form a radiused taper.

21. The airbag device of claim 19 wherein the friction mechanism engaging the scan medium includes a biasing member positioned within the scan medium cartridge and integrally attached to the cartridge by at least one living hinge.

* * * * *